US008040012B2

(12) United States Patent
Meinke et al.

(10) Patent No.: US 8,040,012 B2
(45) Date of Patent: Oct. 18, 2011

(54) ELECTRICAL MACHINERY INCORPORATING DOUBLE HELIX COIL DESIGNS FOR SUPERCONDUCTING AND RESISTIVE WINDINGS

(75) Inventors: Rainer Meinke, Melbourne, FL (US); Philippe Masson, West Melbourne, FL (US); Sasha Ishmael, Melbourne, FL (US)

(73) Assignee: Advanced Magnet Lab, Inc., Palm Bay, FL (US)

( * ) Notice: Subject to any disclaimer, the term of this patent is extended or adjusted under 35 U.S.C. 154(b) by 132 days.

(21) Appl. No.: 12/476,913

(22) Filed: Jun. 24, 2009

(65) Prior Publication Data
US 2009/0295168 A1    Dec. 3, 2009

Related U.S. Application Data

(60) Provisional application No. 61/130,649, filed on Jun. 2, 2008.

(51) Int. Cl.
| H02K 3/04 | (2006.01) |
| H02K 3/00 | (2006.01) |
| H02K 1/00 | (2006.01) |
| H02K 17/00 | (2006.01) |
| H02K 19/00 | (2006.01) |
| H02K 21/00 | (2006.01) |
| H02K 27/02 | (2006.01) |
| H02K 23/26 | (2006.01) |

(52) U.S. Cl. ........ 310/208; 310/198; 310/184; 310/268; 310/179; 310/180; 290/55

(58) Field of Classification Search .................. 310/179, 310/180, 184, 198, 208, 268; H02K 3/00, H02K 17/00, 19/00, 21/00, 23/26
See application file for complete search history.

(56) References Cited

U.S. PATENT DOCUMENTS
3,197,680 A    7/1965  Wingerson
(Continued)

FOREIGN PATENT DOCUMENTS
CA    968398    5/1975
(Continued)

OTHER PUBLICATIONS

Ball, MJ et al, Modulated Double Helix Quadrupole Magnets, IEEE Transactions on Applied Superconductivity, IEEE Service Center Los Alamitos CA, US vol. 13, No. 2—Jun. 1, 2003, pp. 1369-1372.

(Continued)

Primary Examiner — Quyen Leung
Assistant Examiner — John K Kim
(74) Attorney, Agent, or Firm — Ferdinand M. Romano; Beusse, Wolter, Sanks Mora & Maire, P.A.

(57) ABSTRACT

An alternating current machine which generates a magnetic field or induces a voltage. In one embodiment the machine includes a stator and a rotor positioned about an axis. The stator includes three sets of coils, each set including at least a first pair of coil rows wired in series, with first and second members of the first pair configured to generate axial fields in opposite directions. Coil rows in the first pair of each set of coils are each arranged a different distance from the axis. A first member of the pair of the second set of coil rows is positioned between the first and second members of the pair of the first set of coil rows. The distance between the axis and the first member of the second pair of coil rows is intermediate the distances between the members of the first pair of coil rows and the axis.

21 Claims, 12 Drawing Sheets

U.S. PATENT DOCUMENTS

| | | | |
|---|---|---|---|
| 3,761,752 A | | 9/1973 | Anderson |
| 4,100,444 A | * | 7/1978 | Boyd, Jr. ............... 310/184 |
| 4,283,687 A | | 8/1981 | Madey |
| 4,639,708 A | | 1/1987 | Weatherly |
| 4,886,990 A | * | 12/1989 | Barker ............... 310/184 |
| 5,825,111 A | * | 10/1998 | Fei ............... 310/179 |
| 6,255,755 B1 | * | 7/2001 | Fei ............... 310/184 |
| 6,614,141 B2 | * | 9/2003 | Oohashi et al. ............... 310/184 |
| 2002/0060505 A1 | * | 5/2002 | Kawamura ............... 310/184 |
| 2003/0184427 A1 | | 10/2003 | Gavrilin |
| 2004/0041490 A1 | * | 3/2004 | Fei ............... 310/184 |
| 2009/0295168 A1 | * | 12/2009 | Meinke et al. ............... 290/55 |

FOREIGN PATENT DOCUMENTS

| | | |
|---|---|---|
| EP | 0353153 | 1/1990 |
| EP | 0954009 A | 11/1999 |
| FR | 2550026 A | 2/1985 |

OTHER PUBLICATIONS

Ball, MJ et al, "The Double Helix dipole—a novel approach to Accelerator Magnet Design" IEEE Transactions on Applied Superconductivity, IEEE Service Center Los Alamitos, CA, US, vol. 13, No. 2—Jun. 1, 2003, pp. 1365-1368.

* cited by examiner

ELECTRICAL MACHINERY INCORPORATING DOUBLE HELIX COIL DESIGNS FOR SUPERCONDUCTING AND RESISTIVE WINDINGS

RELATED APPLICATION

This application claims priority to provisional patent application U.S. 61/130,649 filed 2 Jun. 2008 which is incorporated herein by reference in the entirety.

FIELD OF THE INVENTION

This invention relates to electromagnetic systems, including systems which generate magnetic fields, systems which generate electric power, motors, and magnets generally. More particularly, the invention relates to electrical machine systems of the type including conductor assemblies which, when conducting current, generate a magnetic field or which, in the presence of a changing magnetic field, induce voltage.

A wide variety of magnet designs are used for electromechanical applications, including rotating machines such as those used for electric power generation. Applications for electric motors and generators can benefit by use of superconducting magnets whose higher magnetic fields enhance performance and substantially reduce the size and cost of such equipment.

In both resistive and superconducting applications, conventional electrical machinery has employed conventional distributed windings, e.g., racetrack-shaped coils, to produce rotating magnetic fields in the stator. Conventional multipole rotors and stators contain separate sets of coil windings for each pole. For example, in a common three phase electrical machine, each of three sets of stator coil windings are constructed with a number of dipole magnet assemblies, e.g., formed in racetrack configurations, wired in series to produce a dipole or a higher order field configuration for each winding. As a result of this configuration, the air gap field contains non-negligible harmonic content which, during rotation of the stator's magnetic fields, among other considerations, contributes to vibration-induced stress on machine components.

Conventional superconducting dipole magnets used for these applications employ racetrack shaped coils which are capable of producing large magnetic fields in the range of 3-10 T. Such coils are usually made with a flat Rutherford style superconducting stranded cable or flat ribbon conductor in order to provide a high current density in a small volume. The geometry of such flat-cable coils dictates that they be wound starting from the inside (or smallest radius) turn to the outermost turn to form a saddle-shaped coil half. Two such halves are mounted opposite to each other to form the dipole configuration. This method of making saddle-shaped racetrack coils (which we will refer to as the "conventional" coil) has numerous drawbacks as described in U.S. Pat. No. 6,921,042.

The use of superconducting windings in electrical machinery (such as induction motors and generators) can provide a high output device in a small size compared to conventional machines. Superconducting windings can generate magnetic fields typically 2-5 times stronger than those which can be obtained with normal resistive windings. Since the energy density rises with the square of the magnetic field, such devices can be considered to be 4-25 times more powerful per unit volume of field than normal types of machines. U.S. Pat. No. 5,672,921 to Herd describes the use of epoxy impregnated superconducting coils of a racetrack shape in the rotating armature for a rotary generator. U.S. Pat. No. 5,777,420 to Gamble shows a superconducting synchronous motor rotor composed of racetrack shaped coils wound with a high temperature superconducting (HTS) material in tape form.

Cost is a major constraint for conventional superconducting magnet technologies which rely on saddle or racetrack coils. Designs which improve reliability add significantly to cost. By way of example, for a given set of operating conditions, significant design efforts must be employed to assure that quenching does not occur during normal system use. Low temperature superconducting coil segments must be mechanically very stable in order to prevent conductor movement which leads to quenches of superconducting coils.

Whether future systems employ resistive or superconductive windings, a need remains to improve both the design efficiency and the reliability of electrical machinery. Such improved performance is needed in electrical machinery of all sizes, including MEMs, electric power generation and large motor applications.

SUMMARY OF THE INVENTION

In accord with exemplary embodiments of the invention, there is provided a conductor assembly of the type which, when conducting current, generates a magnetic field or which, in the presence of a changing magnetic field, induces a voltage. An associated method for constructing the conductor assembly is also provided.

In one series of embodiments, an alternating current machine of the type which generates electricity or is driven by an electric current, includes a stator positioned about an axis and a rotor positioned to turn about the axis of rotation with respect to the stator. The stator includes a plurality of coil rows with each row centered about the axis in a sequence. The stator comprises at least first, second and third sets of coils positioned about the axis in a concentric-like configuration. Each set of coils includes at least a first pair of coil rows wired in series, with first and second members of the first pair configured to generate axial fields in opposite directions. The coil rows in the first pair of the first set, the first pair of the second set and the first pair of the third set are each arranged a different distance from the axis and in a sequence so that a first member of the pair of the second set of coil rows is positioned between the first and second members of the pair of the first set of coil rows. The distance between the axis and the first member of the second pair of coil rows is intermediate the distances between the members of the first pair of coil rows and the axis. In one such embodiment, a first member of the pair of the third set is positioned between the first and second members of the first set of coil rows so that the distance between the axis and the first member of the third pair of coil rows is also intermediate the distances between the members of the first pair of coil rows and the axis. In another embodiment the first member of the pair of the third set is also positioned between the first and second members of the second set of coil rows so that the distance between the axis and the first member of the third pair of coil rows is intermediate the distances between the members of the second pair of coil rows and the axis. In still another embodiment the second member of the pair of the first set is positioned between the first and second members of the third set of coil rows so that the distance between the axis and the first member of the third pair of coil rows is also intermediate the distances between the members of the first pair of coil rows and the axis.

In another embodiment, each set of coils includes at least two pairs of coil rows wired in series, with first and second members in each of the at least two pairs of coil rows in each set configured to generate axial fields in opposite directions;

and all of the coil rows in each of the at least two pairs of coil rows in all three sets of coils are all arranged different radial distances from the axis and in a sequence wherein at least one member of at least one coil pair of the second set of coil rows is positioned between two members of one pair of coil rows in the first set of coils.

In still another example embodiment, each set of coils includes at least two pairs of coil rows wired in series, with first and second members in each of the at least two pairs of coil rows in each set configured to generate axial fields in opposite directions. All of the coil rows in each of the at least two pairs of coil rows in all three sets of coils are all arranged different radial distances from the axis and in a sequence wherein a first member of at least one coil pair of the second set of coil rows is positioned between members of the first pair of coil rows in the first set of coils and is positioned between members of a second of the pairs of coil rows in the first set of coils. The second member of the at least one coil pair of the second set of coil rows is positioned between the second member of the pair of the first set of coil rows and one of the members of one of the pairs of the third set of coil rows.

Further, the machine of may be configured as a motor wherein the stator comprises only three sets of coils positioned about the axis with each rotated about the axis with respect to the others so that with input of a current through each of the coils the stator creates a rotating magnetic field.

In a second series of embodiments an alternating current machine of the type which generates electricity or is driven by an electric current, also includes a stator positioned about an axis and a rotor positioned to turn about the axis of rotation with respect to the stator. The stator includes a plurality of coil rows with each row centered about the axis in a sequence wherein the stator comprises at least first, second and third sets of coils positioned about the axis in a concentric-like configuration. Each set includes at least two pairs of coil rows wired in series, with first and second members in each pair configured to generate axial fields in opposite directions. All of the coil rows in each of the two pairs in all three sets of coils are all arranged different radial distances from the axis and in a sequence with at least one coil pair of the second set of coil rows positioned between two different pairs of coil rows in the first set of coils. In the sequence of coil rows, the members of at least one pair of coil rows in the first set may be positioned next to one another in the sequence with none of the other coil rows positioned in between. The different double helix coil pairs referenced herein as, for example $A'_i, B'_i, C'_i, A'_1, B'_1, C'_i$ are understood to belong to different coil sets for different electrical phases.

In a third series of embodiments, an alternating current machine of the type which generates electricity or is driven by an electric current, also includes a stator positioned about an axis and a rotor positioned to turn about the axis of rotation with respect to the stator. The stator includes a plurality of coil rows with each row centered about the axis in a sequence. The stator comprises a plurality of sets of coil rows positioned about the axis in a concentric-like configuration. Each set n includes one or more pairs, k, of coil rows $C_{k,n}$ and $C'_{k,n}$ wired in series, with coil rows in the stator configured to generate axial fields in opposite directions to partially or completely cancel axial field components. The coil rows $C_{k,n}$ are each positioned radially outward from the axis a distance $R_{k,n}$, the coil rows $C'_{k,n}$ are each positioned radially outward from the axis a distance $R'_{k,n}$ and, collectively, the sequence of coil rows is characterized by a center position a distance $R_C$ from the axis (i) with at least (nk/2)−1 coil rows a distance less than $R_C$ from the axis and (ii) with at least (nk/2)−1 coil rows a distance greater than $R_C$ from the axis, with $$R_c = \frac{1}{nk} \sum_{k,n} \frac{R_{k,n} + R'_{k,n}}{2}$$

In a fourth series of embodiments an alternating current machine of the type which generates electricity or is driven by an electric current includes a stator positioned about an axis includes a rotor positioned to turn about the axis of rotation with respect to the stator. The stator includes a plurality of coil rows with each row centered about the axis in a sequence. The stator comprises a plurality of sets of coil rows, including first, second and third sets of coil rows, positioned about the axis in a concentric-like configuration. Each set n includes one or more pairs, k, of coil rows $C_{k,n}$ and $C'_{k,n}$ wired in series, with coil rows in the stator configured to generate axial fields in opposite directions to partially or completely cancel axial field components. The coils rows $C_{k,n}$ are each positioned radially outward from the axis a distance $R_{k,n}$, the coil rows $C'_{k,n}$ are each positioned radially outward from the axis a distance $R'_{k,n}$ and, collectively, the sequence of coil rows is characterized by a center position a distance $R_C$ from the axis (i) with at least (nk/2)−1 coil rows a distance less than $R_C$ from the axis and (ii) with at least (nk/2)−1 coil rows a distance greater than $R_C$ from the axis. Each of the first and second members of a pair of the first set of coil rows is configured according to:

$$X(\theta) = [h/(2*\pi)]\theta \pm A_n \sin(n\theta)$$

$$Y(\theta) = R \cos(\theta)$$

$$Z(\theta) = R \sin(\theta).$$

If the ratio of stator thickness to $R_c$ is greater than 25 percent, then the mutual inductance of a first one of the sets of coil rows can be within 10% percent of the mutual inductance of a second one of the sets of coil rows. In one example, during operation, the axial field generated by the first set of coil rows may be less than ten percent of the transverse field generated by the first second set of coil rows. Also, a first member $C_{2,n}$ or $C'_{2,n}$ of a pair of coil rows in the second set, may be positioned in the sequence between members $C_{1,n}$ and $C'_{1,n}$ of a pair of coil rows in the first set. Further, a first member $C_{1,n}$ or $C'_{1,n}$ of first pair of coil rows in the first set may be positioned in the sequence between members $C_{3,n}$ and $C'_{3,n}$ of a pair of coil rows in the third set. Within the first set of coil rows, the first member $C_{1,n}$ or $C'_{1,n}$ of the first pair of coil rows in the first set may have a different number of turns, or a different rate of advance per turn in a direction parallel with the axis, than the other member of the first pair of coil rows in the first set.

Figure 1:
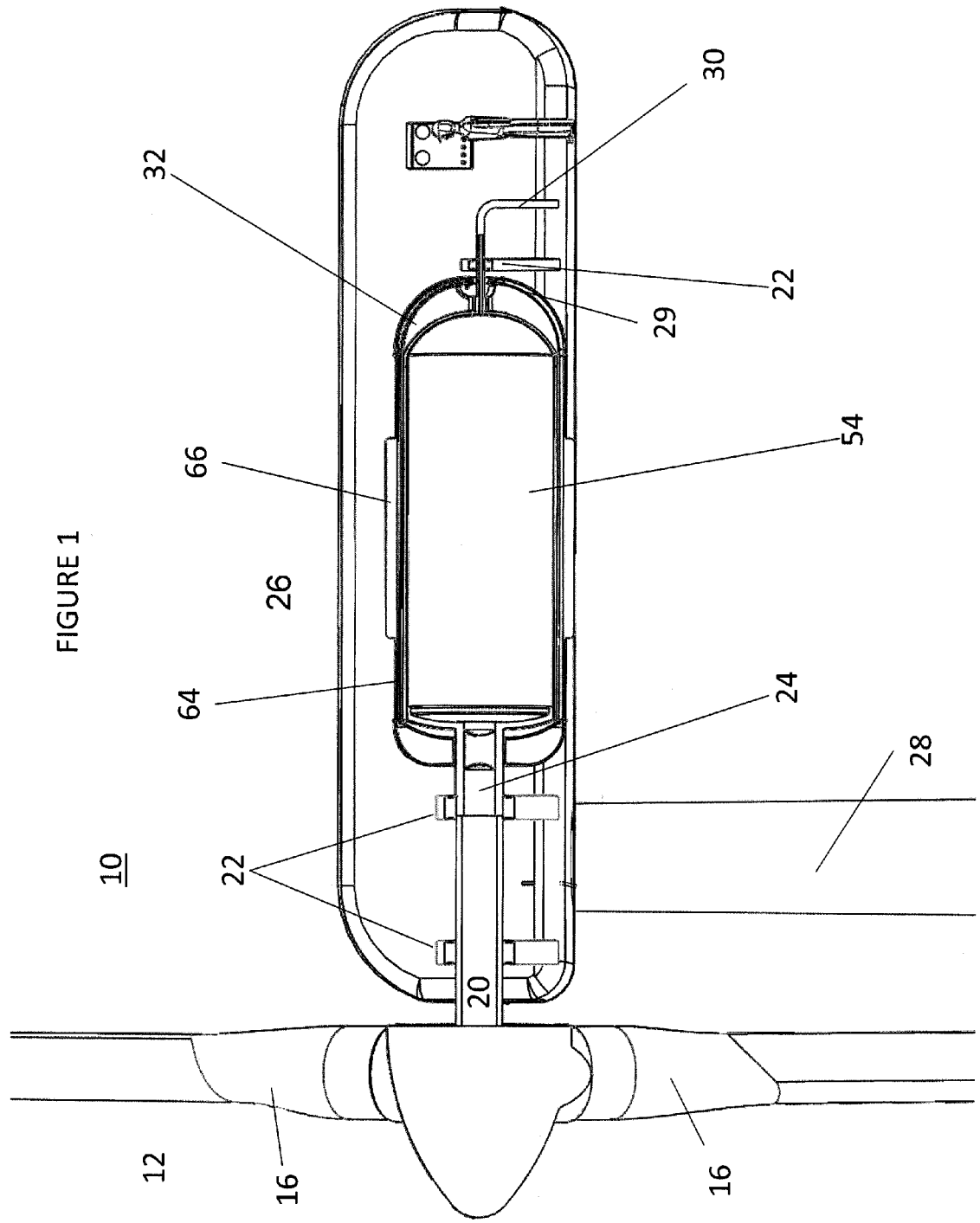
FIG. 1 is a view in cross section taken along a longitudinal axis of a superconducting, wind powered, electric generation system incorporating features of the invention.

Like reference numbers are used throughout the figures to denote like components. Numerous components are illustrated schematically, it being understood that various details, connections and components of an apparent nature are not shown in order to emphasize features of the invention. Various features shown in the figures are not shown to scale in order to emphasize features of the invention.

DETAILED DESCRIPTION OF THE INVENTION

Before describing in detail the particular methods and apparatuses related to embodiments of the invention, it is noted that the present invention resides primarily in a novel and non-obvious combination of components and process steps. So as not to obscure the disclosure with details that will be readily apparent to those skilled in the art, certain conventional components and steps have been omitted or presented with lesser detail, while the drawings and the specification describe in greater detail other elements and steps pertinent to understanding the invention. Further, the following embodiments do not define limits as to structure or method according to the invention, but only provide examples which include features that are permissive rather than mandatory and illustrative rather than exhaustive.

The following patents and patent applications, all assigned to the assignee of the present invention, are incorporated herein by reference: U.S. Pat. No. 6,921,042 (hereafter referred to as the '042 patent); U.S. patent application Ser. No. 12/061,870 "Structure For A Wiring Assembly And Method Suitable For Forming Multiple Coil Rows With Splice Free Conductor" filed 3 Apr. 2008 (hereafter, the '870 Patent); U.S. patent application Ser. No. 12/133,676 "Method of Reducing Multipole Content In a Conductor Assembly During Manufacture" filed 5 Jun. 2008 (hereafter the '676 Patent); U.S. patent application Ser. No. 12/200,964 "High Temperature Superconducting Electromechanical System With Frequency Controlled Commutation For Rotor Excitation" filed 29 Aug. 2008 (hereafter the '964 Patent); U.S. patent application Ser. No. 12/388,306 "Helical Coil Design and Process for Direct Fabrication From a Conductive Layer" filed 18 Feb. 2009 (hereafter the '306 Patent); and U.S. patent application Ser. No. 12/470,328 "Coil Magnets With Constant or Variable Phase Shifts" filed 21 May 2009 (hereafter the '328 Patent)

Terms such as winding, helical winding, wiring pattern and coil configuration as applied to physical embodiments formed of various conductor and/or insulative materials, are used without regard to how the materials are formed in place. That is, although it is conventional to physically wind a strand of conductor in the configuration of a spiral, the foregoing terms as used herein refer to the resulting configuration and not the methodology used to form the pattern. So, for example, a coil or winding may be formed from a cylindrical body by removal of body material, this resulting in a shape that corresponds to a spiral winding. Voids resulting from the removal of material may also correspond to a spiral shape. Such designs, as disclosed and claimed in the '306 Patent are collectively referred to herein as direct helix designs or direct helix coil rows, which, when assembled in a series of concentrically positioned coil rows, are referred to as direct helix assemblies.

Numerous cross sectional conductor shapes may be used in constructing the coil rows. The conductor may be a solid core or a multi-strand conductor, may have a circular shape in cross section, a square shape in cross section, a rectangular shape in cross section or a relatively flat profile, tape-like form. For example, a high temperature superconductor YBCO-based wire may have a tape-like profile with a width dimension in a range, for example, between 2 mm and 5 mm, and a thickness in the range, for example, of 0.09 mm to 0.3 mm. Much larger dimensions are contemplated as well.

Generally as used herein the expression "contour in cross section" means a contour having a shape described according to a view taken along a plane transverse to a relevant direction, such as the direction of a channel path or a conductor path or the direction along which an axis extends. In the case of a curvilinear geometry, the path is based on the direction of a tangent vector at the point of interest. Conductor segments in the illustrated embodiments include both multi-stranded and solid core varieties and are generally filament-like, having a length dimension which is relatively large in proportion to a thickness dimension. The thickness dimension for a conductor segment is measurable along the contour in cross section, which contour is generally understood to be along a plane transverse to the length dimension, although the segment may follow a curved path such as a path of a channel 30.

In the context of the present invention, a sequence of helically-wound, essentially cylindrically shaped coil rows (e.g., with pairs of coil rows having opposite tilt angles) configured to produce a magnetic field has been described in the '042 Patent and in the '870 Patent. However, see the '676 Patent which discloses use of a conductor assembly having individual coil rows, instead of pairs of coil rows having opposite tilt angles, in a conductor assembly capable of generating an axial field in combination with a transverse field. Generally, the foregoing references disclose what is referred to in the literature as a double helix coil row pair or configuration, with individual members of such pairs are referred to as double helix coil rows, wherein the X direction coincides with a main axis about which the pairs of coil rows having opposite tilt angles are formed, concentrically about one another, in accord with Equations 1, Equations 2 or Equations 3. For relatively simple embodiments, the three-dimensional space curves for individual coils found in prior art double helix coil row pairs may be regular helical geometries generated in accord with Equations 1:

$$X(\theta) = [h/(2*\pi)]\theta + A_n \sin(n\theta) \quad\quad 1A$$

$$Y(\theta) = R \cos(\theta) \quad\quad 1B$$

$$Z(\theta) = R \sin(\theta). \quad\quad 1C$$

wherein the X coordinate is along a longitudinal direction parallel with an axis of symmetry and the Y and Z coordinates are along directions both transverse to the axis of symmetry and orthogonal to one another; and $\theta$ is the azimuthal angle measured in a Y-Z plane transverse to the X-axis. The parameter h defines the advance per turn in the X direction. R is the radius of the aperture of the winding pattern. That is, for embodiments having a regular shape, R corresponds to a radial distance from an axis of symmetry to a point on the curve, and the aperture comprehends the cylindrical volume within the shape formed by the helical pattern.

The term $A_n \sin(n\theta)$, in the $X(\theta)$ equation, is a modulating component which imparts a positive or a negative tilt to each of the turns relative to the Y-Z plane, in proportion to the magnitude and sign of the term $A_n$. According to the value of n, the term $A_n \sin(n\theta)$ also introduces a modulation, i.e., a sinusoidal variation in each 360 degree turn of the curve about the axis. For n=1, an ellipsoidal shape is imparted to each turn, this defining the two coil-shaped conductor patterns shown in FIG. 1 of the '042 Patent, and suitable for generating a dipole field. The more complex pattern shown in FIG. 2 of the '328 Patent is generated with a sinusoidal component corresponding to n=2, this being suitable for generating a quadrupole field. For higher values of n, still higher frequency sinusoidal components modulate the shape of each turn. Generally, prior art coil row assemblies in accord with Equations 1, Equations 2 or Equations 3 have been a sequence of two or more double helix coil row pairs extending from a central axis, with the tilt angle sequentially alternating so that each coil row is both preceded by and followed by a coil row having an opposite tilt angle.

As has been explained in the literature for a dipole configuration, with n=1 for the term $A_n \sin(n\theta)$, the coil turns include a tilt relative to planes orthogonal with the illustrated X axis. This results in a significant component of current flow in the axial direction. A transverse magnetic field is therefore generated together with an axial field component. Transverse in this context denotes components of magnetic fields only in planes transverse to the major axis along which the conductor is formed. For embodiments of the invention, in a Cartesian coordinate system this corresponds to a helical coil of cylindrical shape symmetrically formed about the X-axis, with the transverse field components extending in YZ planes. With incorporation of a second layer of turns and with the two patterns having opposite tilt angles relative to a YZ-plane (i.e., by providing the terms $A_n$ in each of the two coils with opposite signs), it is possible to generate a substantially pure transverse field and practically eliminate the axial field component. If fabricated as direct helix coil rows in accord with the '306 Patent, the pair of coil rows is referred to as a direct double helix coil row pair. It is to be understood that individual members in a pair of double helix coil rows may have different values for the respective amplitudes $A_n$ in order to account for the $1/R^{n-1}$ dependence of the field in order to cancel the axial field components.

Still more generally, for embodiments of the invention, the term coil row as used herein means a spiral-like coil of conductor following a three-dimensional space curve generated with Equations 2:

$$X(\theta)=[h/(2*\pi)]\theta+\Sigma A_n \sin(n\theta+\phi_n) \quad 2A$$

$$Y(\theta)=R\cos(\theta) \quad 2B$$

$$Z(\theta)=R\sin(\theta) \quad 2C$$

in accord with the afore-defined terms. $A_n$ is the amplitude of modulation and $\phi_n$ is determinative of phase shifts between the sinusoidal components. Generally, $A_n$ may be a function of $\theta, X(\theta), Y(\theta)$ or $Z(\theta)$, i.e., $A_n=f(\theta, X(\theta), Y(\theta), Z(\theta))$. R determines the radius of the winding pattern, which is measured from the axis of the cylindrically shaped coil and $\theta$ is the azimuth angle. In this context the terms coil and coil row are equivalent, referring to a spiral conductor pattern having a substantially cylindrical shape. The adjective helix may more generally refer to a variety of spiral-like shapes which may be assembled into concentrically positioned coil rows in accord with Equations 1 or Equations 2, but with the understanding that other trigonometric or numerical expressions may be used to define the channel path and the conductor path. The individual or combined content of the fields corresponding to one or more values of n are generally referred to as multipole components.

The term coil row as used herein refers to a continuous series of conductor turns assuming a spiral-like coil shape. In the past, in addition to being positioned next to one another in a sequence, coil rows in double helix pairs have had the same number of turns, N.

Field components generated from a winding configuration formed with double helix coil row pairs, and corresponding to different values of n according to Equations 2, are substantially or entirely orthogonal with one another. For a pure dipole field the summation over multiple modulations is limited to one term, i.e., n=1, wherein the coil pattern forms a helical configuration in which the individual turns are tilted with respect to the transverse Y-Z plane. This tilt angle $\alpha$ is determined by the amplitude $A_1$. When $A_1$ equals R the resulting tilt angle, $\alpha$, is 45 degrees and increases with the size of the amplitude.

As noted, an individual layer of a double-helix coil can simultaneously generate transverse and axial magnetic fields. As used herein, reference to a double-helix assembly means a coil assembly comprising one or more pairs double helix coil rows with each member of a pair configured in accord with Equations 1 or Equations 2 or Equations 3, and positioned along a common axis so that an axial field generated by one coil row is positioned in a direction opposite the direction of an axial field generated by the other coil row so that the axial fields can cancel one another in whole or part. As further described herein, the current directions in individual double helix coil rows (e.g., layers comprising conductor) may be chosen in such a way that the transverse magnetic fields of layers add up, while the axial fields are canceled to a high degree. It is therefore becoming common to sometimes describe the magnetic field by two dimensional multipoles in the transverse plane. If the field changes along the X-direction, e.g. as is the case near the coil ends, a two dimensional multipole expansion can still be used to describe the field, and the multipole contents for different axial positions are determinable. In accord with Equation 2A, the multipole field components that can be generated with the resulting coil pattern correspond to the values of n for which each $A_n$ is nonzero.

In a sufficiently long winding configuration comprising double helix coil row pairs, where coil end effects can be neglected, the pattern for n=1 will generate an essentially pure dipole field having no higher order components. Similarly, a quadrupole pattern (n=2), a sextupole pattern (n=3) and other even higher order patterns generate pure fields with the multipole order defined by the value of n. Magnetic fields of almost arbitrary shape and quality can be generated in accord with the above mathematics. However, construction of coils for generating fields with a higher multipole order (n>1) or fields containing more than one multipole order, e.g., a superimposition of dipole and quadrupole fields, is limited by geometrical constraints, such as requiring a minimum spacing between conductors to avoid conductor impingement. The conductor spacing in a coil is controlled by the term h. For increasing values of h the conductors are spaced further apart along the direction of the X-axis. The minimum conductor spacing corresponds to when adjacent conductors just touch each other. Any further decrease in conductor spacing would lead to interference between neighboring conductors.

Still, even more generally, a three-dimensional space curve of a helical-shaped conductor may be generated in accord with the equations 3:

$$X(\theta)=[h/(2*\pi)]\theta \pm \Sigma A_n f_1(n\theta) \quad 3A$$

$$Y(\theta)=Rf_2(\theta) \quad 3B$$

$$Z(\theta)=Rf_3(\theta) \quad 3C$$

wherein $f_1$, $f_2$ and $f_3$ are arbitrary functions which may be trigonometric or numerical expressions but are not so limited. For the illustrated embodiments $f_1$, $f_2$ and $f_3$ are as disclosed for a three-dimensional space curve according to Equations 2, i.e., for a single layer or coil row of conductor. With coils helically-wound about an axis to produce magnetic field components transverse to the axis, cancellation of axial field components can be effected by the formation of coil rows in concentrically positioned double helix pairs having opposite tilt angles, this sometimes resulting in a high quality transverse field, e.g., a uniform dipole with essentially no higher order components. See, for example, Goodzeit et al., "The Double-Helix Dipole—A Novel Approach to Accelerator Magnet Design", *IEEE Transactions on Applied Superconductivity*, Vol. 13, No. 2, June 2003, pp. 1365-1368, which describes analytics for a double helix coil pair magnet geometry. See, also, the '042 Patent which discloses straight coil rows for magnets, i.e., coil rows formed along straight axes with fields that are constant along the magnet axis as would be suitable for incorporation into a rotor or a stator. The inventive concepts disclosed herein may be practiced in conjunction with the design and manufacturing concepts disclosed in the '870 Patent; and may also be practiced in conjunction with the direct helix designs disclosed in the '306 Patent.

Figure 2:
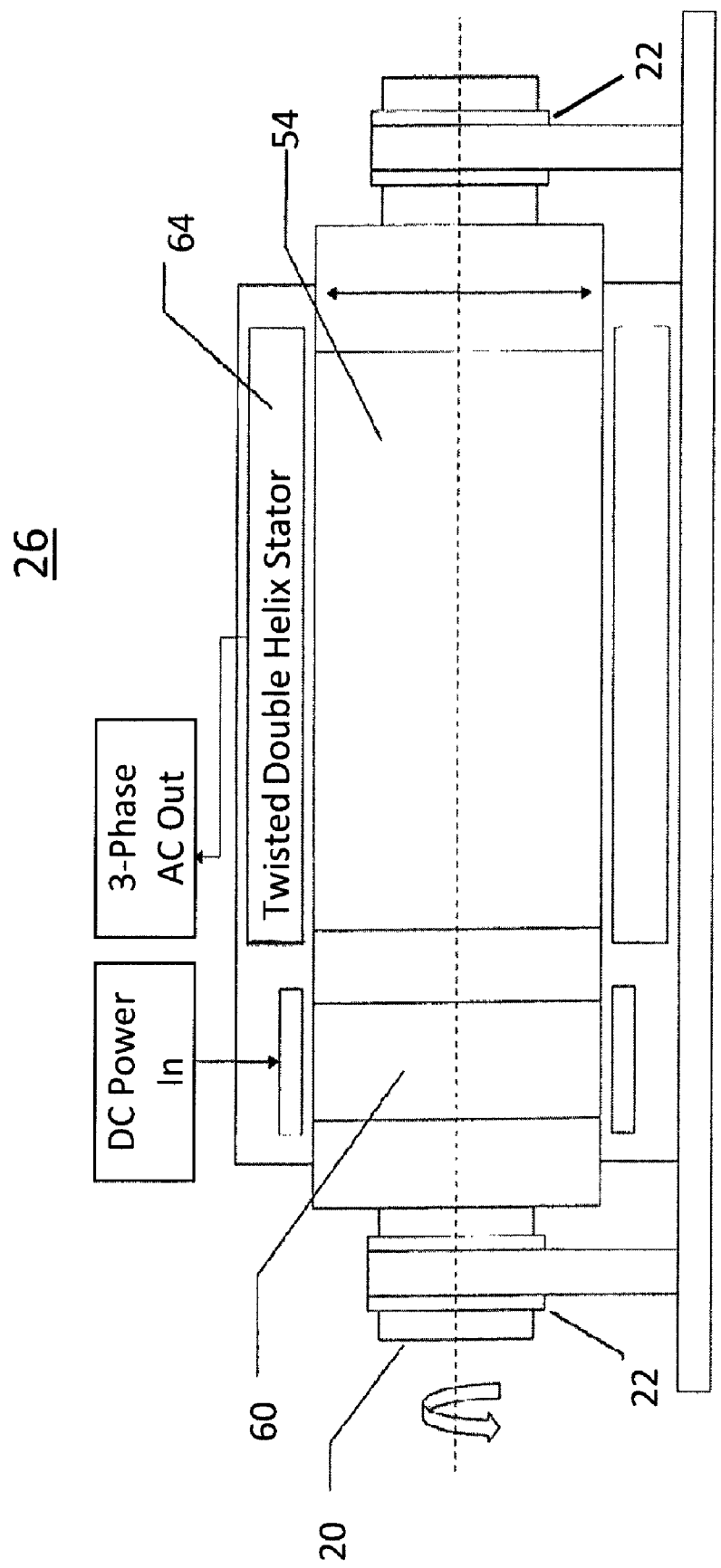
FIG. 2 is a schematic view further illustrating features of a generator section in the system shown in FIG. 1.

FIG. 1 of the '870 Patent, and FIGS. 2-6 and 8 of the '306 Patent, illustrate fabrication features for constructing double helix coil rows for embodiments of the invention, e.g., with opposing tilted angles resulting in partial, substantial or complete cancellation of axial field components in order to generate a predominantly transverse field with each double helix coil row pair.

According to an exemplary design and fabrication sequence more fully described in the '870 Patent, an initial coil geometry for a desired coil row design is first defined. This will be a function of numerous parameters including the shape of the conductor cross section, conductor dimensions, and the number of turns, N, of conductor in the coil row. Subsequently, for each defined layer of an insulative material, e.g., a composite resin, along a cylindrically shaped surface of a layer, a corresponding channel geometry is tooled therein to receive the conductor. By way of example, G code instructions may be generated, based in part on the conductor path trajectory, $X(\theta), Y(\theta), Z(\theta)$, for application in a CNC machine to create an appropriate channel profile and channel path in the composite material. The tooling can be accomplished with sufficient precision that placement of segments of conductor to form each coil row in each composite layer assures positioning of all segments with sufficient precision as to assure that the fields generated from the combination of row patterns corresponds closely with the fields modeled for the coil design.

With this methodology, a variety of channel profiles and conductor cross sectional shapes can be formed to create coil designs. Provision of a channel in an insulative layer enables advantageous positioning of a conductor of arbitrary shape along an insulative layer in a coil row. For conductors of arbitrary cross sectional shape, provision of channels in the insulative material on which a coil row is formed pre-defines a path for the conductor without dependency on any conductor provided in an underlying coil row. As shown in the illustrated embodiments, it is now possible to more fully utilize more optimum wiring patterns to create more efficient designs of electrical machines without compromising reliability, e.g., by separating all of the coil rows with insulative layers and pre-defining the wiring patterns with channels formed in the insulative layers. This is particularly advantageous for brittle conductors such as high temperature ceramic superconductors because positioning such material, e.g., $MgB_2$, can assure stability.

Formation of channels for positioning the conductor provides precise position and conductor stabilization while also isolating portions of the conductor from other portions of the conductor. The channel may be configured to match the cross sectional shape of the conductor. The conductor pattern and the corresponding channel path can be formed in a relatively tight helical configuration wherein h, the advance per turn in an axial direction, is so small that portions of the conductor in adjacent turns come into contact. In such embodiments the conductor has an insulative coating. The channels can accommodate square or rectangular cross sections, allowing optimization of current density relative to coil volume, this resulting in higher fields with less conductor length.

To minimize deformation on conductor having rectangular cross sectional shape, the channels can be formed at a variable angle with respect to a central axis or reference surface. In such embodiments, the resulting field will differ from that which is generated for a conventional conductor of circular cross sectional shape, in part because a channel for a circular shaped conductor will not follow the same path as a channel which accommodates a rectangular shaped conductor. In other embodiments, channels with rectangular cross sectional shapes can be formed in a normal and invariant orientation with respect to the layer surface. In these embodiments the conductor may be conformed to the path in order to assume a more optimum current carrying capability. Channels can be formed in a variety of shapes and in layers of various material types, including metals, composites and ceramics. The channels may be formed by machining or other techniques, including molding, casting, etching, or laser cutting.

The position of a conductor as defined by the channel pre-determines the field "shape" and field quality (e.g., uniformity). The conductor path can be defined in the channels to achieve the theoretical optimum position of the entire conductor path. According to embodiments of the invention, this is of particular import for generating optimum designs of machines which generate rotating fields. Achieving the theoretical positioning provides the optimum field quality in terms of the desired multipole orders with removal of systematic errors and providing compensation for the radial dependence of fields when the coil rows have differing distances from the common axis. That is, channel design can sufficiently minimize introduction of "random" errors in coil rows and enable implementation of optimum parameter values, e.g., h, $A_n$, by positioning conductors sufficiently close to the theoretically correct positions. With this approach multiphase stator windings can be generated with coil rows to create an adjustment which offsets effects resulting from sequential placement of different coil rows at different radial distances with respect to the coil rows in a rotor.

In this regard, a need is now recognized to provide a first order method to avoid problems which, in certain designs, might otherwise result from the radial dependence of magnetic fields. According to the first order method, an equivalent radial position is defined for and adjusted among multiple double helix coil pairs in a stator such that resulting magnetic flux from the sets of coil pairs associated with each phase can be of similar or identical value at and about the rotor. By incorporating this feature in the stator of a generator, the voltage and current amplitudes among different phases can become more uniform.

A need is also recognized to provide a second order method to further adjust for the different radial distances at which coil pairs associated with different phases are positioned. According to the second order method, the design of individual members of coil row pairs in the stator can be adjusted to provide more uniform magnetic flux ?field strengths, at and about the rotor, from sets of coil pairs that are each associated with a different phase of a multiphase stator winding. By incorporating this feature, alone or in combination with the first order method, in the stator of a generator, the voltage and current amplitudes among different phases can become more uniform.

To the extent an optimum design is sought on the basis of the first or second order method, accuracy of placement of conductor at a precise distance from a common axis, and accuracy of replicating predefined modulations in the cylindrical plane of a coil row, are only limited by precision of modern machining centers.

Stabilizing coil row conductors in channels also prevents movement of the conductor which may be caused by changes in temperature and Lorentz forces. For a superconducting stator, the provision of channels enables formation of more reliable magnets that have optimized uniformity in magnetic flux among coil row pairs associated with different phases. Except for direct double helix embodiments, without provision of channels for securing the conductors in the coil rows, the conductors in low temperature superconductor designs are more prone to slip and create a "quench" in the magnet, this potentially leading to a catastrophic destruction of the magnet.

For superconducting magnets, machined channels according to the '870 Patent or the '306 Patent provide the conductor with additional stability to mitigate movement when temperature cycling. In accord with the '870 Patent, by covering a segment of conductor, positioned in a machined groove for a coil row, with an overlying layer of composite material additional adhesion and stability are attained. Further, isolation of the conductor loops within the same coil row and between adjacent coil rows, reduces or eliminates the potential electrical shorts between turns for both insulated and for certain non insulated conductors. Also, as described in the '870 Patent and the '306 Patent, channels may be defined about the coil rows to provide cooling paths around the conductor. Suitable cooling sources include liquid nitrogen, liquid and gaseous hydrogen, liquid and gaseous Neon, liquid and gaseous helium and, in the case of coil rows designed for resistive applications, water.

FIG. 1 schematically illustrates an all superconducting, wind powered, electric generation system 10 incorporating double helix coil rows in a three phase stator and in an associated rotor. A turbine section 12 of the system includes a set of wind blades 16, connected via a shaft 20, mounted on bearings 22, through a torque tube 24 to the rotor of a generator section 26. The turbine section and the generator section are mounted on a tower 28. The illustrated generator section, housed in a cryostat 29, operates in a low temperature superconducting state which is achieved with cooling lines 30 which introduce gaseous helium for circulation throughout the rotor and stator windings. The generator section 26 also includes a flux pump 32 which may be in accord with an embodiment disclosed in the '964 Patent. See also FIG. 2 which further illustrates the generator section 26. The generator section is designed for operation at a rotor speed of about 10 RPM, but design principles described in conjunction with the system 10 are applicable to high RPM electrical rotating machine systems as well. The generator section 26 is an electromechanical system which incorporates features of the invention. The generator section 26 also includes numerous conventional components that are omitted for clarity, with this description focusing on features more relevant to providing an understanding of the invention. The rotor 54, also mounted on bearings 22, operates with a brushless exciter 60.

Figure 3:
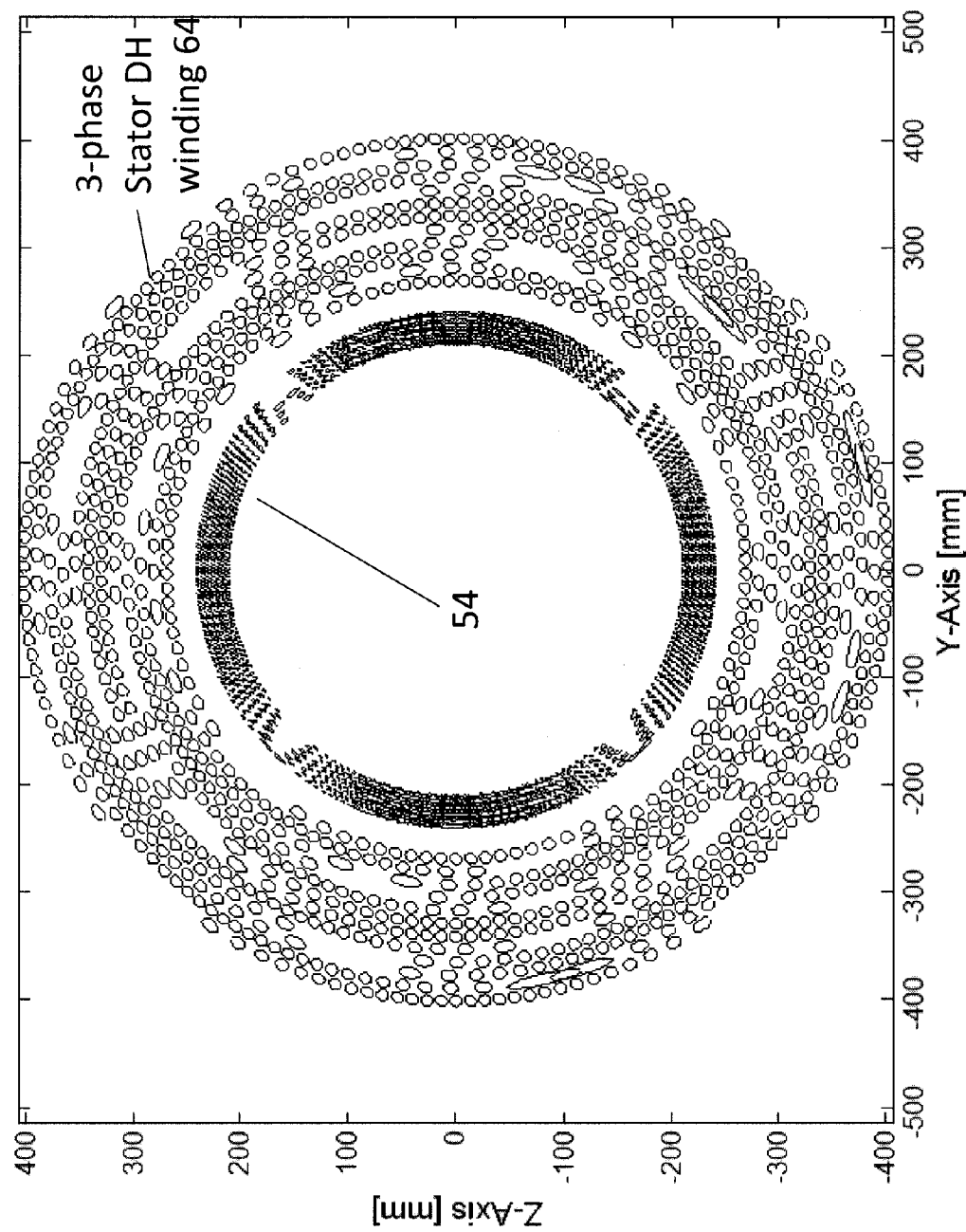
FIG. 3 is a partial view in cross section of an exemplary stator-rotor configuration according to the invention.
Figure 4:
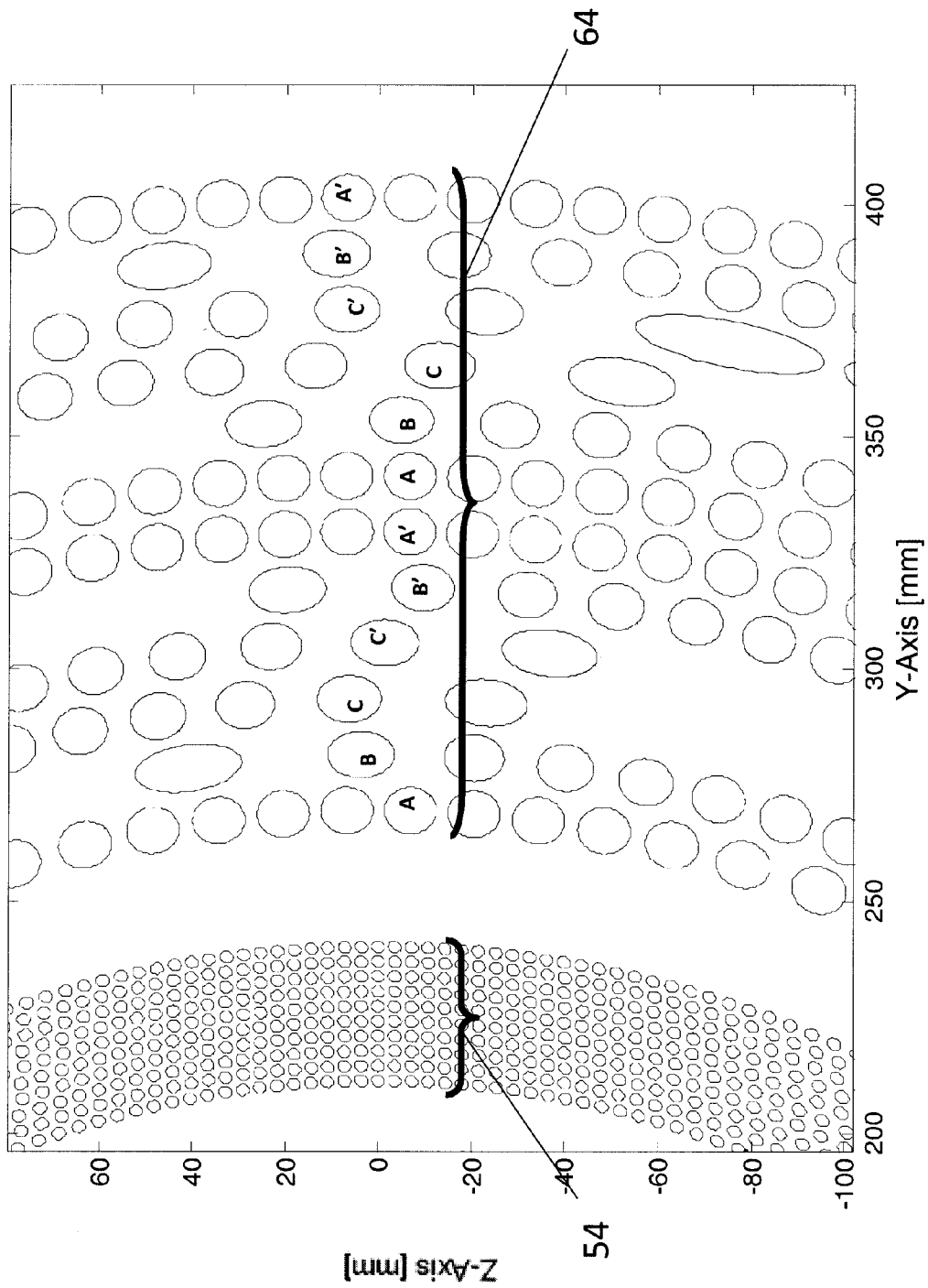
FIG. 4 is an enlarged partial view of the cross section shown in FIG. 3, further illustrating coil rows in a rotor and a stator.

An example embodiment of the stator-rotor combination of the generator section is further shown in the cross sectional views of FIG. 3 and FIG. 4 with the rotor 54 including five pairs of double helix coil rows and the stator 64 including six pairs of double helix coil rows. In a conventional manner the double helix coil rows of the rotor are wired in series, and the six pairs of double helix coil rows of the stator are configured as three sets of windings wired for three phase operation. That is, each coil set includes two pairs of double helix coil rows. The rotor 54 is mounted about the shaft 20 and torque tube 24 for rotational movement with respect to the stator 64 positioned thereabout. A backiron shield 66 is shown positioned about the stator 64. The rotor 54 and the stator 64 are both direct double helix designs, but in other embodiments the rotor may operate as a resistive winding.

With the stator configured as a three-phase double helix design, all of the coil rows may be of a twisted multipole design as described in the '328 Patent. By way of example, the coil rows may each follow a different space curve around the X axis in accord with a phase transformation such as described by Equations 2 herein in combination with Equations 5 of the '328 Patent, wherein $A_n=0$ for all values of n except n=2 to generate a dipole field. In other embodiments, the stator coil rows may be configured with n only equal to 3 or 4 to generate, respectively, quadrupole or sextupole fields in accord with Equations 2 or Equations 3 herein. Higher order multipole geometries (octupoles, etc.) for the coil rows are also contemplated. Further, the coil rows may follow space curves wherein multiple values of n are non-zero.

The exemplary rotor 54 may comprise an arbitrary number of pairs of double helix coil rows ($C1_{rotor}$ and $C1'_{rotor}$), ($C2_{rotor}$ and $C2'_{rotor}$)...($Cm_{rotor}$ and $Cm'_{rotor}$). Although five such pairs are shown in FIGS. 3 and 4, embodiments described in other figures illustrate a different number of rotor coil rows which are also wired in series. In addition to the embodiment of the stator 64, other stators suitable for operation in the system 10 (as well as in other electrical rotating machine systems) comprise two or more than three sets of coil windings with each set including one or multiple pairs of double helix coil rows. For purposes of initially describing features of the invention, single pairs of coil rows A, A', B, B', C, C' are shown schematically in the simplified view of a stator 64' shown in FIG. 5, which may be interchanged with the stator 64 of FIGS. 1, 2 and 3. The stator 64' is a series of concentrically formed coil rows formed within layers of a composite resin as described in the '870 Patent. An innermost one of the coil rows, designated A is shown integrally formed with a structural inner core or shell of the stator. The outermost one of the coil layers, designated A' is covered with an insulative overwrap layer. In an example embodiment of the invention, each of the rotor and stator coil rows may be configured as the twisted multipole coil row 70 with all of the coil rows in the generator having the same or nearly the same twist and the same multipole order. Each coil row includes a plurality of interconnected open loops 71 consistent with the number of turns, N, in the coil row. See, for example, the exemplary twisted quadrupole coil row of FIG. 6 which illustrates a twisted quadrupole helical pattern for a coil row. The coil row 70 of FIG. 6 follows a quadrupole pattern that revolves along the loops 71 instead of repeating every 360 degrees. The coil row 70 is shown to have 46 conductor loops 71 but the number of turns, N, can vary from fewer than 10 to hundreds or thousands or more turns depending on the application.

Figure 5:
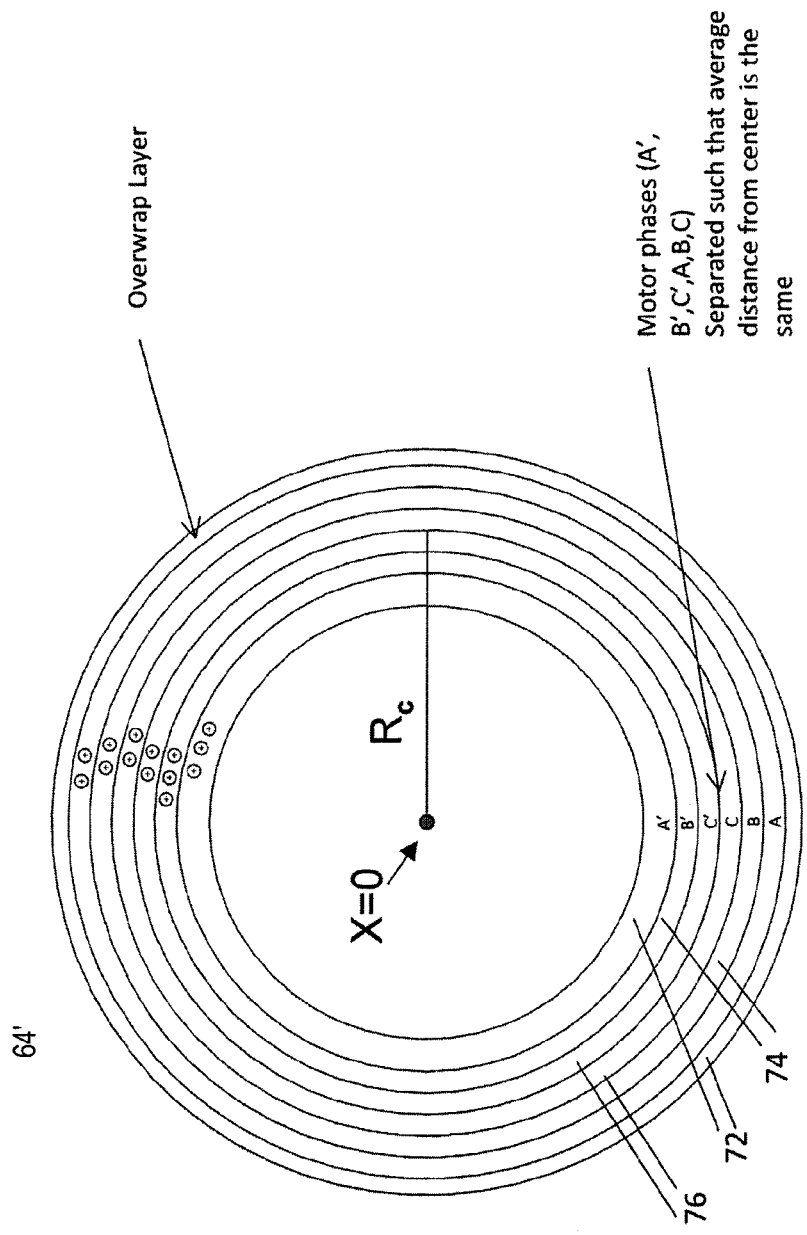
FIG. 5 is a view in cross section of the stator 64' incorporating features of the invention.
Figure 6:
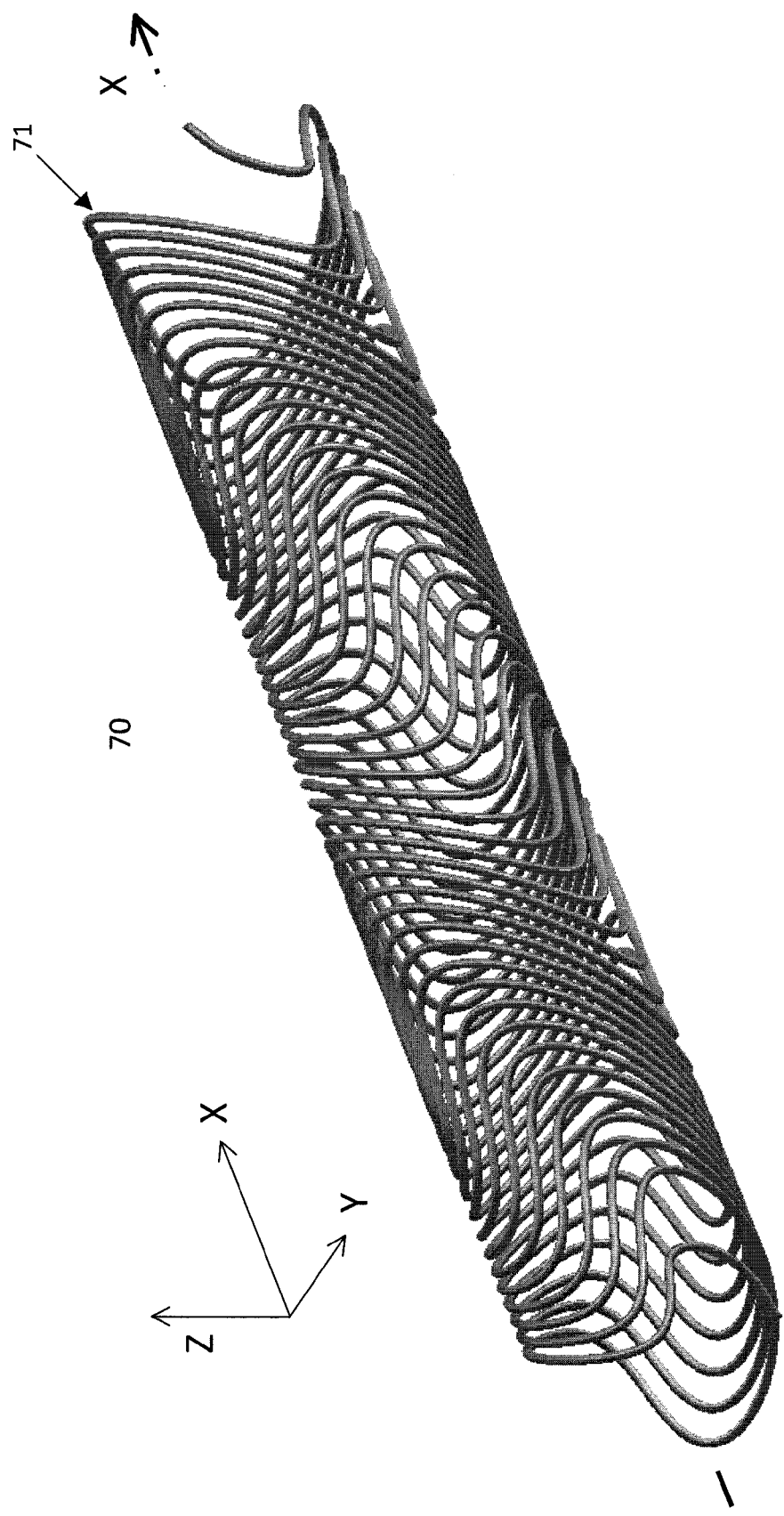
FIG. 6 is a perspective view of a twisted multipole wiring pattern which may be used to form individual coil rows of stators and rotors in systems according to the invention.

Referring again to the view in cross section of FIG. 5, the stator 64', configured as a three phase stator, has three coil sets each corresponding to a different one of three pairs of double helix coil rows 72, 74 and 76. Each pair of coil rows 72, 74 and 76 corresponds to a separate one of three phases. Coils A, A' are members of the pair 72, coils B, B' are members of the pair 74 and coils C, C' are members of the pair 76. Each coil row pair provides a phase excitation positioned at a 120 degree rotational spacing relative to another one of the pairs. For a motor application, instead of being configured as the generator section 26, each pair of coil rows 72, 74 and 76 may be independently connected to a different power source, with the power introduced to each pair being 120 degrees out of phase with respect to the two other sources.

Because coil rows of the stators 64 and 64' are concentrically positioned over one another, the magnetic field generated by each coil row is progressively further from the rotor field as a function of distance of the stator coil row from the rotor or the common axis. In order for each phase to provide an equivalent radial position of the resultant magnetic field experienced by the rotor, the individual members of each coil pair are shown positioned in a sequence such that the average distance between each of the two members in each pair and the rotor (or the average distance between each of the two members in each pair and the axis) is the same. According to several embodiments of the invention, average distances of different pairs of coils from the rotor are the same. See, again, FIGS. 4 and 5. As a result, the coil rows for the stator 64' of FIG. 5 are ordered in the following sequence: A, B, C, C', B', A'. Accordingly, for one embodiment of the invention (i.e., the stator 64' having three pairs of double helix coils, with one pair of double helix coils corresponding to each of three different phases) the coils in one or more pairs are placed radially inward and outward with respect to at least one other pair. For example, the coil B' is positioned radially inward with respect to the coil pair CC' and the coil B is positioned radially outward with respect to the coil pair CC'. More generally, a three-phase stator may comprise many multiples of the illustrated three pairs of coil rows (A,A'), (B,B') and (C,C') with members in pairs positioned radially inward and radially outward with respect to one or more other pairs. The double helix coil rows may be configured among more than three coil sets (e.g., to provide a six phase or a 12 phase configuration) or may be wired to provide two or more double helix pairs of coil rows in each coil set.

In the configuration of FIG. 5, the radial center lines of each of the three different coil sets 72, 74 and 76, i.e., A-A', B-B' and C-C', are positioned during fabrication in the sequence A, B, C, C', B', A' with spacings adjusted as needed so that individual members of each coil pair are shown so positioned at distances relative to the rotor that the average distance between each of the two members in each pair and the rotor (or the axis) is the same.

With the average distances of different pairs of coils from the rotor being the same radial distance from the rotor, the average distances all coincide with a common centerline position $R_c$, enabling mutual inductances among the three pairs of coil rows to be approximately equal. The distance $R_c$ is illustrated in FIG. 5 as a vector extending from the axis (X=0) to a midpoint between the coil rows C and C'. Multiple examples of such coil row patterns are shown schematically in FIGS. 7, 9 and 10 without illustration of the axis (X=0). The illustrated pairs of coil rows have a common centerline $R_c$ (i.e., the same average distance from the axis among members in the same pair). Generally, according to numerous embodiments of the invention, the average distance of members in each pair from the common axis is the same distance $R_c$ from the common axis. This is to be compared with the arrangement shown in FIG. 8 wherein the coil pairs are in the sequence A, B, C, A', B', C' resulting in an arrangement where the average distance $R_{AA'}$, $R_{BB'}$, $R_{CC'}$, between each of the two members A and A', B and B' C and C' in each pair and the rotor is different. Embodiments in accord with the sequence shown in FIG. 8 may possibly be modified with the aforedescribed second order method to achieve a satisfactory balance of mutual inductance among pairs of double helix coil rows or more generally among coil rows in multiple coil sets of a multi-phase stator.

Figure 7:
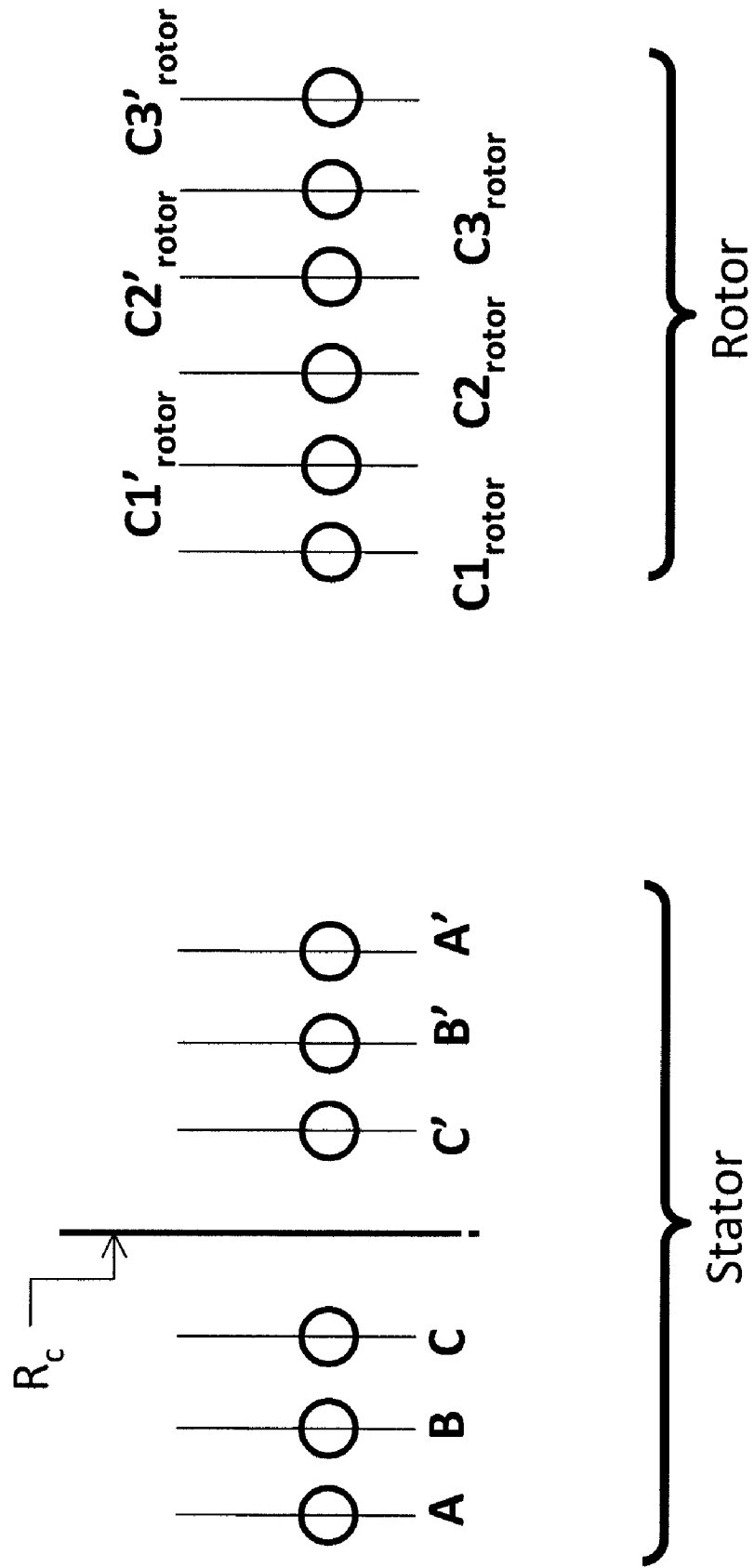
FIG. 7 is a schematic illustration of a sequence of coil rows according to the invention.
Figure 8:
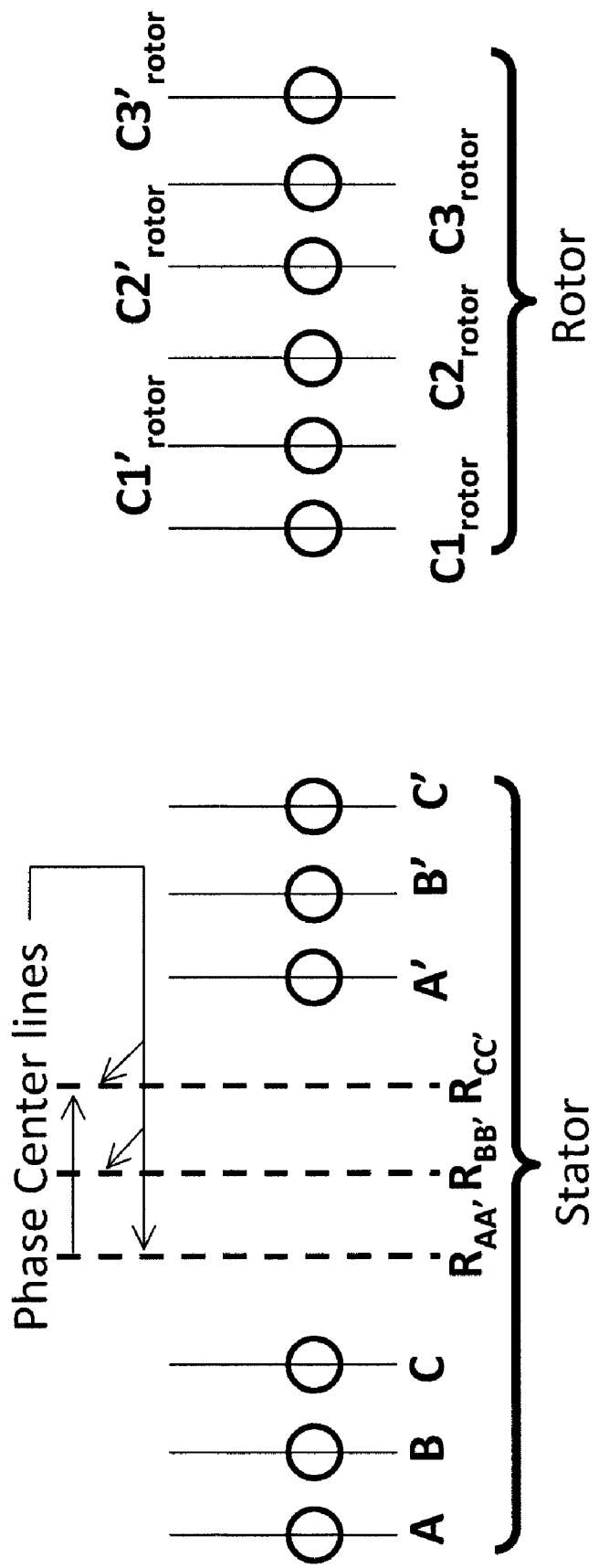
FIG. 8 is a schematic illustration of another sequence of coil rows according to an embodiment of the invention.

Generally, substantially equal mutual inductances can be had among multiple coil sets, even though the radial distances of each coil row, relative to the common axis, or the rotor will generally differ. This is accomplished by positioning each pair of double helix coils so that the average of the distances of the members of each coil pair in each coil set, relative to the common axis, is the same. By providing an equal average of these radial distances, $R_c$, and by minimizing the spacing between all coil rows, the same maximum value of mutual inductance can be had for each of the coil pairs of coil rows 72, 74 and 76. In the embodiment of FIG. 5 the coil rows are also referred to as coil sets 72, 74 and 76. For purposes of illustration, the radial separation between coil rows in the sequence A, B, C, C', B', A' of FIG. 7 is exaggerated and not drawn to scale.

Greater precision to achieve equal mutual inductances can be had, in accord with the aforedescribed second order method by, for example, adjusting the number of turns in each coil row. Based on the example of FIG. 7, by providing an equal average of the radial distances in each pair: at $R_c$, for each of any number of coil rows in any number of coil sets, and by minimizing the spacing between all coil rows, the same maximum value of mutual inductance between coil sets having different phases can be had for each of the coil sets 72, 74 and 76.

For the system 10 and other embodiments of alternating current machines having a stator and a rotor, with the stator comprising a plurality of sets of coil rows positioned about the axis in a concentric-like configuration, each set n of coil rows includes one or more pairs, k, of coil rows $C_{k,n}$ and $C'_{k,n}$ wired in series, and coils in the stator may be configured to generate axial fields in opposite directions to partially or completely cancel axial field components. The coils $C_{k,n}$ can each be positioned radially outward from the axis a distance $R_{k,n}$, with the coils $C'_{k,n}$ each positioned radially outward from the axis a distance $R'_{k,n}$. Collectively, the sequence of coils is characterized by a center position a distance $R_C$ from the common axis. At least (nk/2)−1 coils are positioned a distance less than $R_C$ from the axis and at least (nk/2)−1 other coils are positioned a distance greater than $R_C$ from the axis, with $$R_c = \frac{1}{nk} \sum_{k,n} \frac{R_{k,n} + R'_{k,n}}{2}.$$

Figure 9:
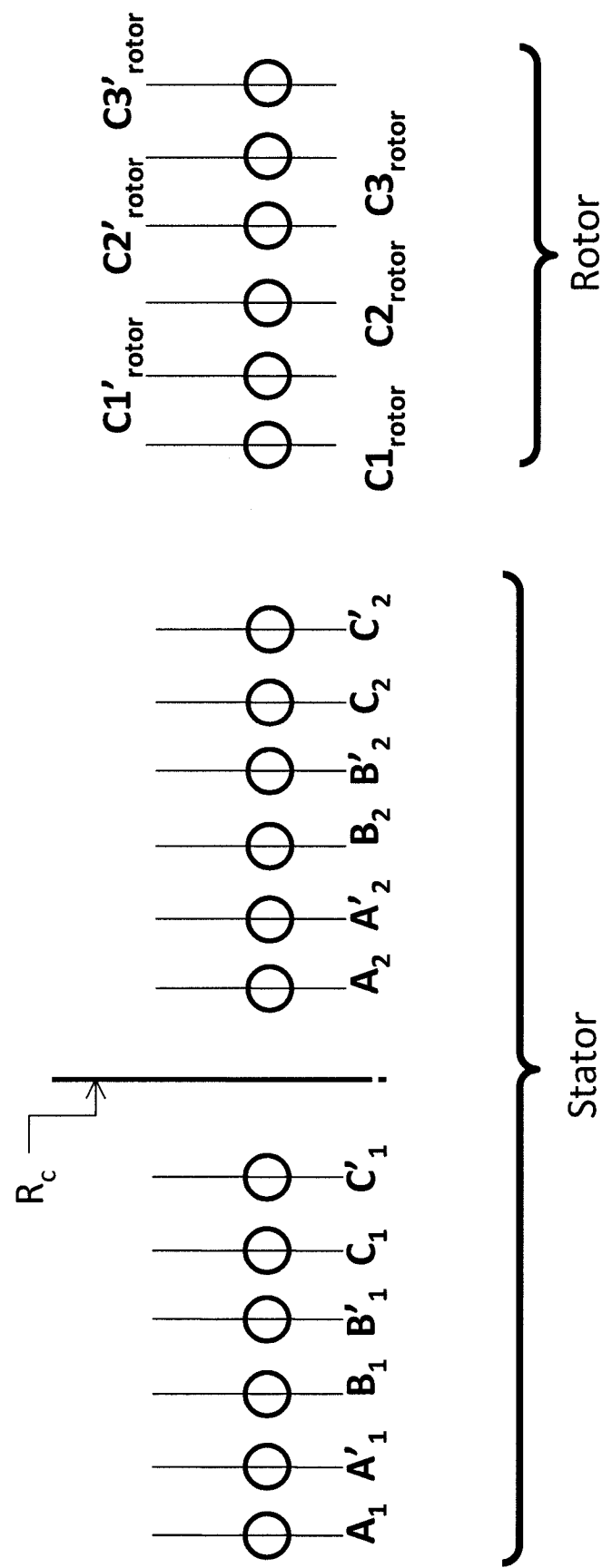
FIGS. 9 and 10 are schematic illustrations of other sequences of coil rows according to other embodiments of the invention.
Figure 10:
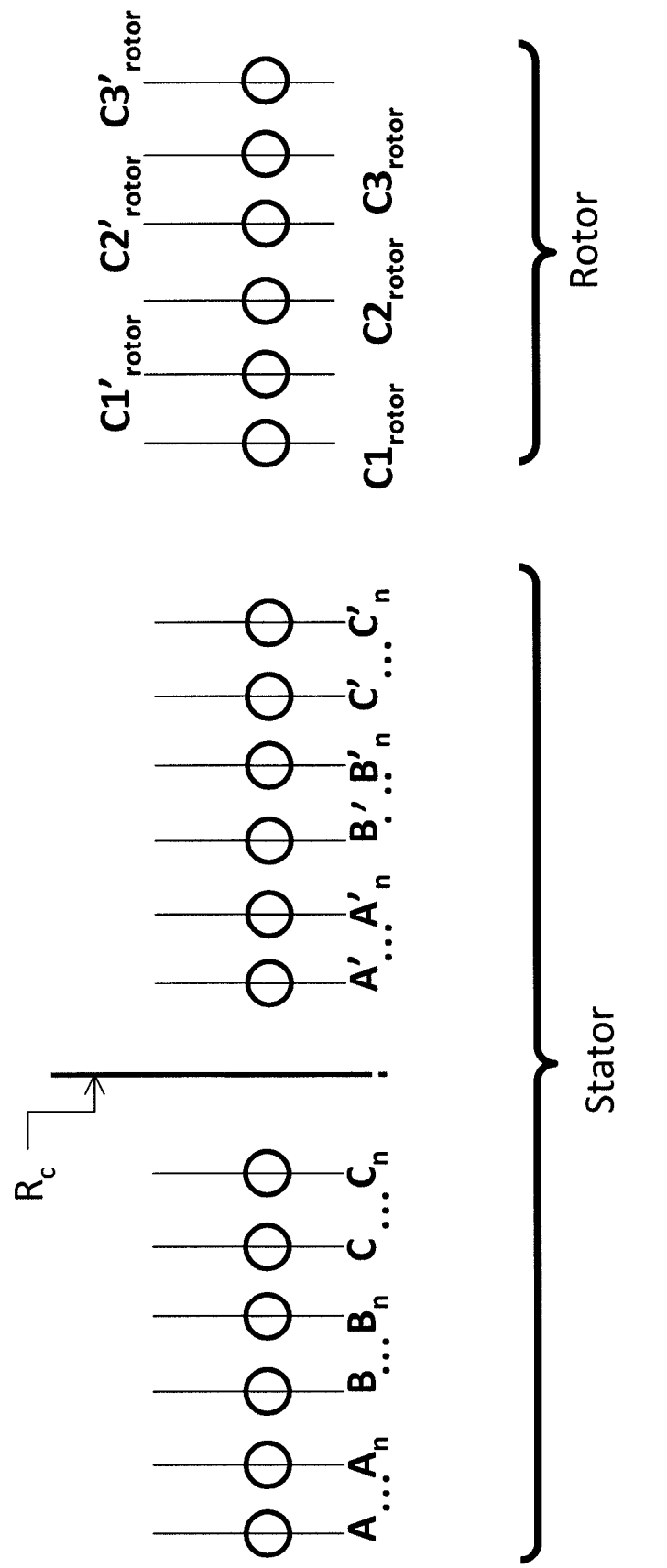

To obtain the maximum possible mutual inductance, embodiments of rotors and stators for the system 10 may include many more double helix pairs of coil rows than illustrated in the figures. With reference to FIGS. 9 and 10 other embodiments of the invention include other stator designs suitable for the generator section 126, comprising an arbitrarily large number of double helix coil rows $Ci_{rotor}$ and $Ci'_{rotor}$ in the rotor as well as n pairs of double helix coil rows in each of the coil sets. In the example of FIG. 10 the coil rows of different coil sets $A_i$, $A_i'$, $B_i$, $B_i'$ and $C_i$, $C_i'$ are in the sequence of $A_1 \ldots A_n$, $B_1 \ldots B_n$, $C_1 \ldots C_n$ $A_1' \ldots A_n'$, $B_1' \ldots B_n'$, and $C_1' \ldots C_n'$. In the example of FIG. 9, the coil rows of different coil sets $A_i$, $A_i'$, $B_i$, $B_i'$ and $C_i$, $C_i'$ are exemplary of a more general sequence: $A_1, A_1' \ldots A_i, A_i', B_1$, $B_1' \ldots B_i, B_i', C_1, C_1' \ldots C_n, C_n', B_j B_j' \ldots B_n, B_n', A_j$, $A_j' \ldots A_n A_n'$.

In still other embodiments, an uneven number of coil rows can be used among the stator coil sets if a cancellation of the axial field component is not needed or would even be advantageous.

Figure 11:
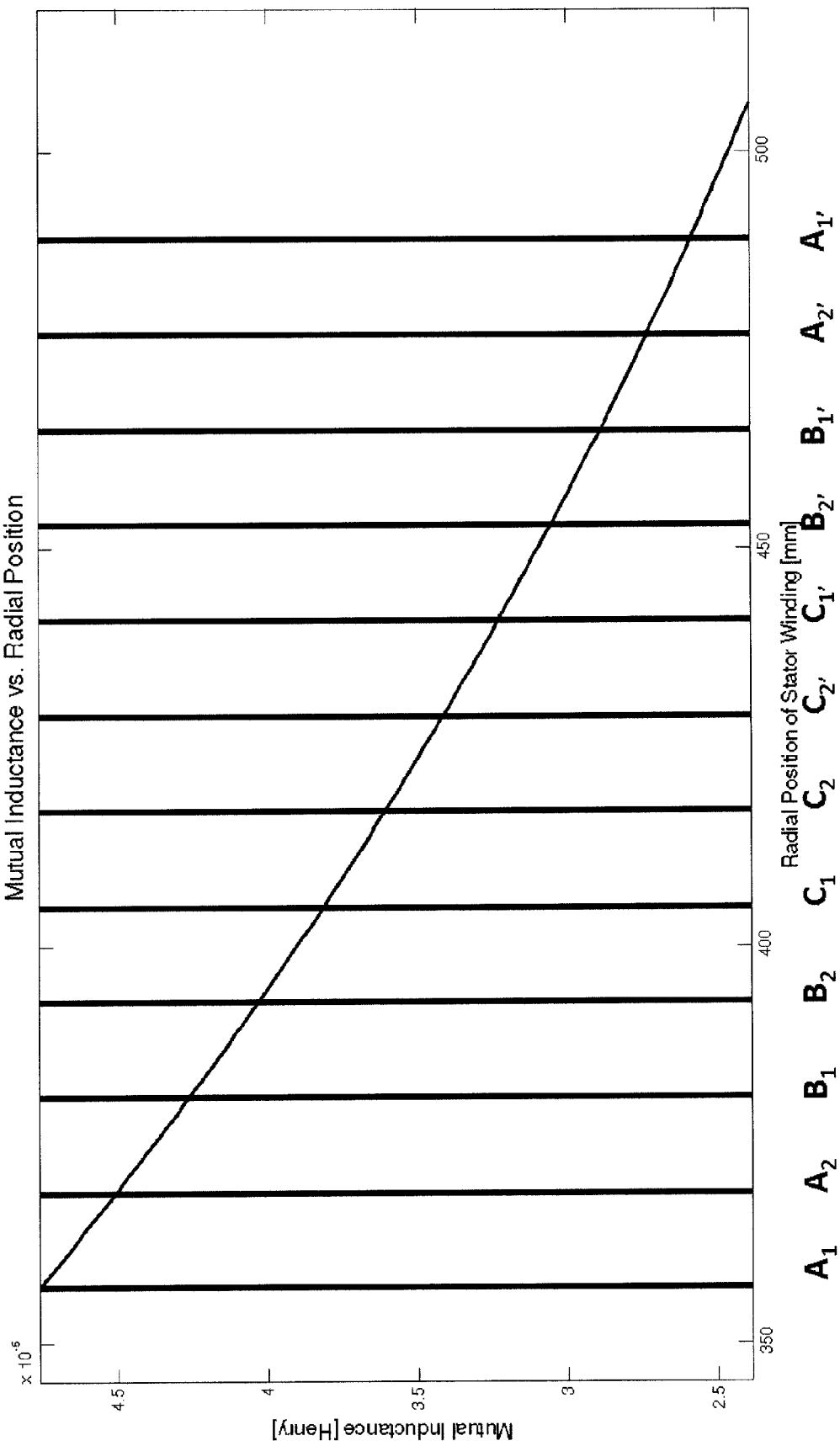
FIGS. 11 and 12 are graphs illustrating mutual inductances for members of pairs of double helix coil rows in a stator relative to a rotor position according to the invention.
Figure 12:
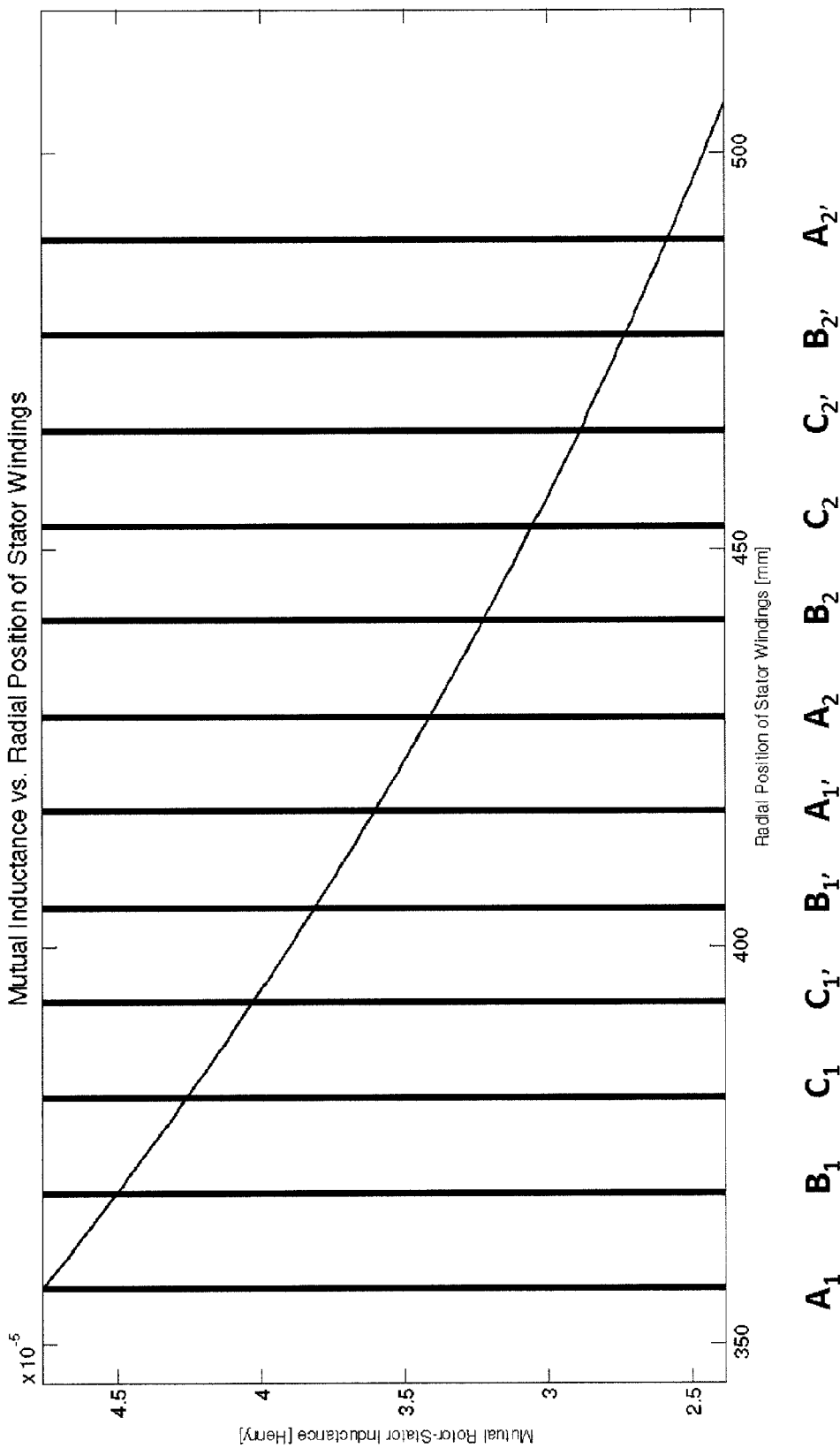

A method for balancing the mutual inductances between the rotor and the stator windings involves first determining the mutual inductance between the rotor and a stator for a given machine size as a function of radial distance. The resulting plot of mutual inductance versus distance, as shown in FIG. 11, illustrates that the sum of the mutual inductances for pairs of double helix coil rows (e.g., $A_i, A_i'$, $B_i$, $B_i'$ and $C_i$, $C_i'$) can be substantially or identically equal (e.g., to within about two percent) from pair to pair in accord with the sequence of FIG. 10. Similarly, FIG. 12 illustrates that the sum of the mutual inductances for pairs of double helix coil rows according to still another sequence (A1, B1, C1, C1', B1', A1', B2, C2, C2', B2', A2') can be substantially or identically equal (e.g., to within about 0.5 percent).

Generally, according to embodiments of the invention, the afore-described arrangements for multiple stator and rotor coil rows can be configured to equalize the mutual inductance, i.e., flux sharing, between the rotor and stator coils.

Recognizing that development of manufacturing technology as described in the '870 Patent and the '306 Patent has been relatively recent, there has not been a design capability to apply the double helix technology to generators and other electrical machinery. The intrinsic high field uniformities which are theoretically achievable with double helix coil rows requires manufacture of precision coil rows in a design which is stable under the high forces experienced during coil excitation. In the case of the system 10, the ability to create high field uniformity minimizes output voltage harmonic distortion. With undesired harmonics being minimized, vibration and vibration-induced stress are also reduced. Manufacture of double helix coil rows with processes of the '870 Patent and the '306 Patent also enables fabrication of a continuous stator winding in one layer to create any number of poles based on the chosen values of n.

In stators incorporating double helix coil pairs it will often be preferred that the axial components of the magnetic flux density be substantially or completely canceled out. This can be accomplished by either adjusting the number of turns (N) or the modulation amplitude ($A_n$) in the individual coil rows forming a double helix. By adjusting the axial component magnitude of the field generated by each coil row in a pair, the resulting field can be perfectly transverse, i.e., radial. For the self inductance of each phase to be equal, and for the mutual inductance between each phase and the rotor winding to be equal, more may be required than radial positioning of the coil rows for each double helix pair, i.e., placing the coil row pairs symmetrically about one another with respect to an average radius $R_c$ common to all the pairs. The design may further requires variation of the number of layers, n, and/or of the modulation amplitude ($A_n$) because of the non linear field variation in the radial direction.

In electrical machines, as the thickness T of the stator windings increases in proportion to the total radial dimension the machine, the mutual inductances influences the same parameters which would otherwise cancel the axial flux. The axial field present when the mutual inductances are perfectly balanced can be of a few percent of the transverse field. Alternately, with a design that completely cancels the axial fields, an imbalance in mutual inductances among the different stator windings can result, e.g., on the order of a few percent. This effect can be problematic when the stator is connected to feed power into the grid. To minimize this effect, an optimization can be performed to simultaneously minimize an imbalance of mutual inductances and maximize cancellation of the axial field components. The optimization can operate through varying the number of turns in the coil rows and/or the modulation amplitude $A_n$, and/or the turn advance h, and, when possible, the radial positions of the coil rows with respect to the average radius of the stator winding. That is, the coil rows may not be placed in positions perfectly symmetrical about the average radius $R_c$ of the stator windings.

By way of example, balancing of mutual and self inductances along with axial field cancellation, with minimum error, can be obtained by minimizing a composite objective function in one of the following forms.

When Varying the Number of Turns N:

$$\chi^2(N_i, N_{i'}, R_i, R_{i'}) = \sum_{i=1}^{N} \left(\frac{M_{ir} + M_{i'r}}{2 - M_{ref}}\right)^2 + \alpha \sum_{i=1}^{N} \left(\sum_{x=-L/2}^{L/2} B_{axial,i,x}^2\right)$$

When Varying the Modulation Amplitude $A_n$:

$$\chi^2(A_{ni}, A_{ni'}, R_i, R_{i'}) = \sum_{i=1}^{N} \left(\frac{M_{ir} + M_{i'r}}{2 - M_{ref}}\right)^2 + \alpha \sum_{i=1}^{N} \left(\sum_{x=-L/2}^{L/2} B_{axial,i,x}^2\right)$$

When Varying the Turn Advance h:

$$\chi^2(h_i, h_{i'}, R_i, R_{i'}) = \sum_{i=1}^{N} \left(\frac{M_{ir} + M_{i'r}}{2 - M_{ref}}\right)^2 + \alpha \sum_{i=1}^{N} \left(\sum_{x=-L/2}^{L/2} B_{axial,i,x}^2\right)$$

where:
$N_i$ is the number of turns for layer i
$N_{i'}$ is the number of turns for layer i' forming a double helix with layer i
$A_{ni}$ is the modulation amplitude of layer i
$A_{ni'}$ is the modulation amplitude of layer i'
$h_i$ is the turn advance of layer i
$h_{i'}$ is the turn advance of layer i'
$M_{ir}$ is the mutual inductance between layer i and the rotor winding
$M_{i'r}$ is the mutual inductance between layer i' and the rotor winding
$M_{ref}$ is the desired mutual inductance
$B_{axial,i,x}$ is the axial component of the flux density generated by double helix pair of layers
i at the position x of the good field region.

N is the number of pair of layers
L is the length of the good field region
α is a regularization parameter
$R_i$ is the radial location of the coil i with respect to the common axis
$R_{i'}$ is the radial location of the coil i' with respect to the common axis While the invention has been described with reference to particular embodiments, it will be understood by those skilled in the art that various changes may be made and equivalents may be substituted for elements thereof without departing from the scope of the invention.

The claimed invention is:

1. An alternating current machine of the type which generates electricity or is driven by an electric current, comprising:
    a stator positioned about a first axis; and
    a rotor positioned to turn about the axis of rotation with respect to the stator, the stator including a plurality of coil rows with each coil row in the plurality centered about the first axis in a sequence, each coil row in the plurality comprising a conductive coil formed with a continuous series of turns spiraling about the first axis, wherein:
    the stator comprises at least first, second and third sets of the coil rows positioned about the axis in a concentric-like configuration, each set including at least a first pair of the conductive coils wired in series, with first and second members of the first pair configured to generate axial fields in opposite directions,
    wherein the first member of the first pair of coils is positioned a first distance from the first axis and the second member of the first pair of coils is positioned a second distance from the first axis and wherein for each first pair of coils one member coil is positioned a different distance from the first axis than the other member coil in the same pair and the coils of the first, second and third sets are arranged in a sequence with respect to the first axis such that a first member of the pair of the second set of coils is positioned between the first and second members of the pair of the first set of coils so that the distance between the first axis and the first coil of the second pair of coils is intermediate the first and second distances.

2. The machine of claim 1 wherein a first member of the pair of the third set is positioned between the first and second members of the first set of coil rows so that the distance between the axis and the first member of the third pair of coil rows is also intermediate the distances between the members of the first pair of coil rows and the axis.

3. The machine of claim 2 wherein the first member of the pair of the third set is also positioned between the first and second members of the second set of coil rows so that the distance between the axis and the first member of the third pair of coil rows is intermediate the distances between the members of the second pair of coil rows and the axis.

4. The machine of claim 1 wherein the second member of the pair of the first set is positioned between the first and second members of the third set of coil rows so that the distance between the axis and the first member of the third pair of coil rows is also intermediate the distances between the members of the first pair of coil rows and the axis.

5. The machine of claim 3 wherein the second member of the pair of the first set is positioned between the first and second members of the third set of coil rows so that the distance between the axis and the first member of the third pair of coil rows is also intermediate the distances between the members of the first pair of coil rows and the axis.

6. The machine of claim 5 wherein the second member of the pair of the second set is positioned between the second member of the first set of coil rows and the second member of the third set of coil rows.

7. The machine of claim 6 wherein the second member of the pair of the second set is positioned between the first member of the third set of coil rows and the second member of the third set of coil rows.

8. The machine of claim 1, wherein each set of coils includes at least two pairs of coil rows wired in series, with first and second members in each of the at least two pairs of coil rows in each set configured to generate axial fields in opposite directions, and
    wherein all of the coil rows in each of the at least two pairs of coil rows in all three sets of coils are all arranged different radial distances from the axis and in a sequence wherein at least one member of at least one coil pair of the second set of coil rows is positioned between two members of one pair of coil rows in the first set of coils.

9. The machine of claim 1, wherein:
    each set of coils includes at least two pairs of coil rows wired in series, with first and second members in each of the at least two pairs of coil rows in each set configured to generate axial fields in opposite directions, and
    all of the coil rows in each of the at least two pairs of coil rows in all three sets of coils are all arranged different radial distances from the axis and in a sequence wherein a first member of at least one coil pair of the second set (B1B1' or B2B2') of coil rows is positioned between members of the first pair of coil rows in the first set of coils and is positioned between members of a second of the pairs of coil rows in the first set of coils.

10. The machine of claim 9, wherein a second member of the at least one coil pair of the second set of coil rows is positioned between the second member of the pair of the first set of coil rows and one of the members of one of the pairs of the third set of coil rows.

11. The machine of claim 1 configured as a motor wherein the stator comprises only three sets of coils positioned about the axis with each rotated about the axis with respect to the others so that with input of a current through each of the coils the stator creates a rotating magnetic field.

12. The machine of claim 1 configured as an all superconducting, wind powered, electric generation system wherein the stator is positioned about the rotor.

13. The machine of claim 2 wherein first and second members of the pair of the third set of coil rows are positioned between the first and second members of the second set of coil rows so that the distance between the axis and each of the first and second members of the third pair of coil rows is intermediate the distances between the members of the first pair of coil rows and the axis.

14. An alternating current machine of the type which generates electricity or is driven by an electric current, comprising:
    a stator positioned about an axis; and
    a rotor positioned to turn about the axis of rotation with respect to the stator, the stator including a plurality of coil rows with each row centered about the axis in a sequence wherein:
    each coil row in the plurality comprises a conductive coil formed with a continuous series of turns spiraling about the first axis; and
    the stator comprises at least first, second and third sets of coils positioned about the axis in a concentric-like configuration, each set including at least two pairs of coil rows wired in series, with first and second members (in each pair) configured to generate axial fields in opposite directions, wherein all of the coil rows in each of the two pairs in all three sets of coils are all arranged different radial distances from the axis and in a sequence wherein at least one coil pair of the second set of coil rows is positioned between two different pairs of coil rows in the first set of coils.

15. The machine of claim 14 wherein, in the sequence of coil rows, the members of at least one pair of coil rows in the first set are positioned next to one another in the sequence with none of the other coil rows positioned in between.

16. An alternating current machine of the type which generates electricity or is driven by an electric current, comprising:
    a stator positioned about an axis; and
    a rotor positioned to turn about the axis of rotation with respect to the stator, the stator including a plurality of coil rows with each row centered about the axis in a sequence wherein:
    the stator comprises a plurality of sets of coil rows positioned about the axis in a concentric-like configuration, each set n including one or more pairs, k, of coil rows $C_{k,n}$ and $C'_{k,n}$ wired in series, with coil rows in the stator configured to generate axial fields in opposite directions to partially or completely cancel axial field components, wherein the coil rows $C_{k,n}$ are each positioned radially outward from the axis a distance $R_{k,n}$, the coil rows $C'_{k,n}$ are each positioned radially outward from the axis a distance $R'_{k,n}$ and, collectively, the sequence of coil rows is characterized by a center position a distance $R_C$ from the axis (i) with at least (nk/2)−1 coil rows a distance less than $R_C$ from the axis and (ii) with at least (nk/2)−1 coil rows a distance greater than $R_C$ from the axis, with $$R_c = \frac{1}{nk} \sum_{k,n} \frac{R_{k,n} + R'_{k,n}}{2}.$$

17. The machine of claim 16 wherein the sets of coil rows of the stator are configured to be superconducting.

18. The machine of claim 16 wherein the sets of coil rows of both the stator and the rotor are configured to be superconducting.

19. The machine of claim 16 further including a wind turbine and configured to generate electric power.

20. An alternating current machine of the type which generates electricity or is driven by an electric current, comprising:
    a stator positioned about an axis; and
    a rotor positioned to turn about the axis of rotation with respect to the stator, the stator including a plurality of coil rows with each row centered about the axis in a sequence wherein:
    the stator comprises a plurality of sets of coil rows, including first, second and third sets of coil rows, positioned about the axis in a concentric-like configuration, each set n including one or more pairs, k, of coil rows $C_{k,n}$ and $C'_{k,n}$ wired in series, with coil rows in the stator configured to generate axial fields in opposite directions to partially or completely cancel axial field components, wherein the coils rows $C_{k,n}$ are each positioned radially outward from the axis a distance $R_{k,n}$, the coil rows $C'_{k,n}$ are each positioned radially outward from the axis a distance $R'_{k,n}$ and, collectively, the sequence of coil rows is characterized by a center position a distance $R_C$ from the axis (i) with at least (nk/2)−1 coil rows a distance less than $R_C$ from the axis and (ii) with at least (nk/2)−1 coil rows a distance greater than $R_C$ from the axis;
    each of the first and second members of a pair of the first set of coil rows is configured according to:

$X(\theta) = [h/(2*\pi)]\theta \pm A_n \sin(n\theta)$ $Y(\theta) = R \cos(\theta)$ $Z(\theta) = R \sin(\theta)$;

the ratio of stator thickness to $R_c$ is greater than 25 percent; and
    the mutual inductance of a first one of the sets of coil rows is within ten percent of the mutual inductance of a second one of the sets of coil rows.

21. The machine of claim 20 wherein, during operation, the axial field generated by the first set of coil rows is less than ten percent of the transverse field generated by the first second set of coil rows and the mutual inductance of a first one of the sets of coil rows is within 0.5 percent of the mutual inductance of a second one of the sets of coil rows.

* * * * *